Figure 1:
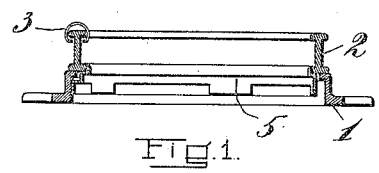

M. H. MALONEY.
SPINNING MECHANISM.
APPLICATION FILED JAN. 10, 1910.

1,153,237.

Patented Sept. 14, 1915.
3 SHEETS—SHEET 1.

WITNESSES
M. E. Flaherty.
George Langton.

INVENTOR
Michael H. Maloney
By
his attorneys.

M. H. MALONEY.
SPINNING MECHANISM.
APPLICATION FILED JAN. 10, 1910.

1,153,237.

Patented Sept. 14, 1915.
3 SHEETS—SHEET 2.

WITNESSES
M. E. Flaherty.
George Langton.

INVENTOR
Michael H. Maloney
By
his attorneys.

M. H. MALONEY.
SPINNING MECHANISM.
APPLICATION FILED JAN. 10, 1910.
1,153,237.
Patented Sept. 14, 1915.
3 SHEETS—SHEET 3.
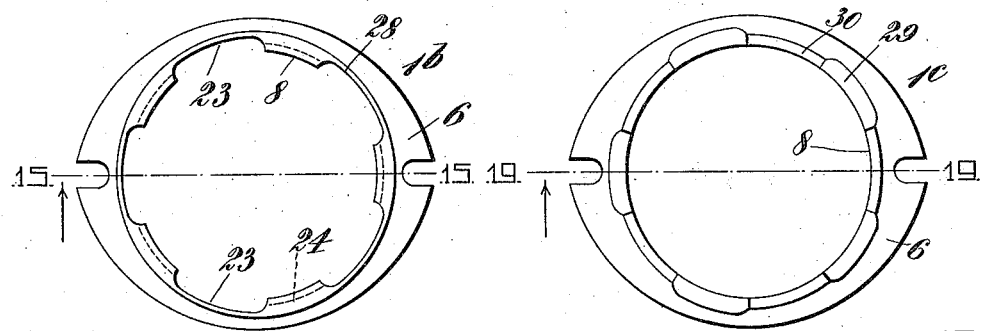
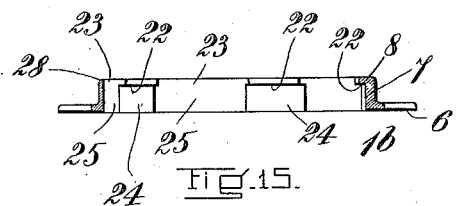
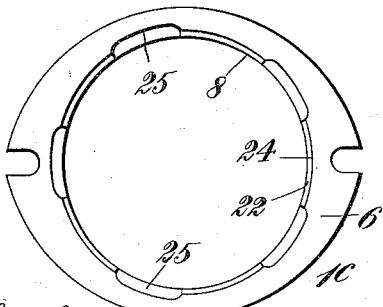
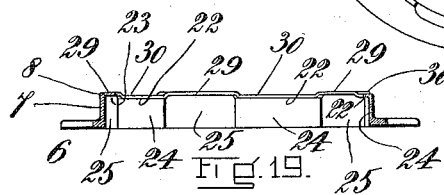
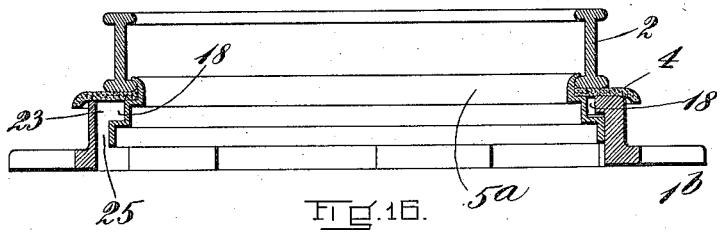
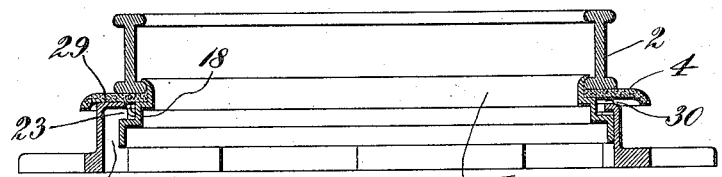
Witnesses
M. E. Flaherty.
George Langton
Inventor
Michael H. Maloney
By
Clarke Raymond Brown
his attorneys

UNITED STATES PATENT OFFICE.

MICHAEL H. MALONEY, OF PLYMOUTH, MASSACHUSETTS.

SPINNING MECHANISM.

1,153,237. Specification of Letters Patent. Patented Sept. 14, 1915.

Application filed January 10, 1910. Serial No. 537,156.

*To all whom it may concern:*

Be it known that I, MICHAEL H. MALONEY, of Plymouth, in the county of Plymouth and State of Massachusetts, a citizen of the United States, have invented a new and useful Improvement in Spinning Mechanisms, of which the following is a full, clear, and exact description, reference being had to the accompanying drawings, forming a part of this specification, in explaining its nature.

My invention relates to an improvement in spinning mechanisms or devices which have as elements of their construction a rotary traveler ring or other rotating part, a base on which the traveler ring or other rotating part is mounted to rotate and a holder connecting with the ring and extending inside the base to coöperate therewith whereby the ring may be retained to properly rotate.

My invention relates also to an improvement in the relative form, adaptation and arrangement of the various parts of the device.

It is among the essential objects of my invention to so inclose the working parts or bearings of the device as to prevent the entry of lint or other foreign matter to them; to so adapt and arrange the working parts or bearings that lint or other foreign substance cannot easily collect or lodge upon them, and to so adapt and arrange these parts or bearings, also, that should lint or other substance enter the interior working parts or bearings such substance will be swept away or dislodged and directed out of such parts.

It is a further object of my invention to provide a construction in which the traveler ring will be retained to rotate with as nearly absolute precision as possible consistent with a free and proper retention of the ring, also, to provide a construction in which the traveler ring will be retained to have at all times proper freedom of rotation with respect to the traveler though tending to prevent an excessive freedom of rotation of the traveler ring or such as would allow the ring to gather momentum during its rotation. In this connection it will be observed that while the mounting or arrangement of the traveler ring should be such that it may be freely rotatable yet it is inadvisable that the ring be allowed to rotate at an excessive or high speed as it might do especially when impelled by the pulls of strong yarn on the traveler. In other words, I have found that the advantages to be derived from a rotary ring are materially increased if the mounting of the ring and the disposition and arrangement of the parts controlling the same are such as to provide a freely rotatable though relatively slow rotating ring. I have according to my present invention provided means whereby the ends above referred to may be substantially accomplished.

My invention can best be seen and understood by reference to the drawings, in which—

Figure 4:
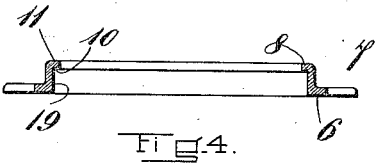
Figure 2:
Figure 5:
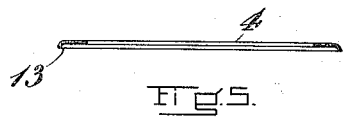
Figure 3:
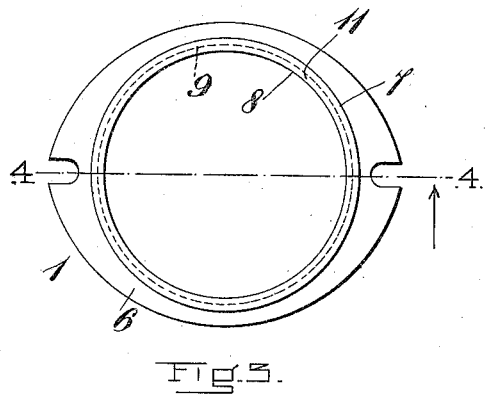
Figure 6:
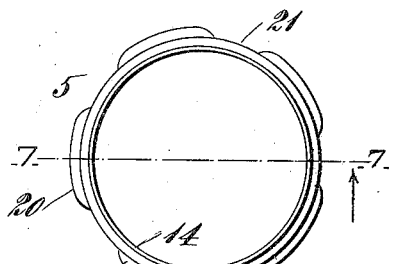
Figure 7:
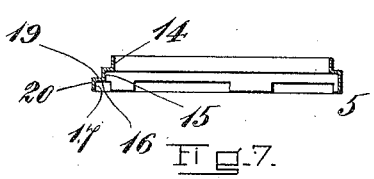
Figure 8:
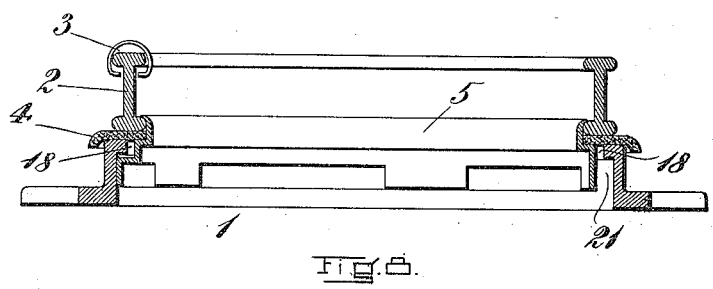
Figure 9:
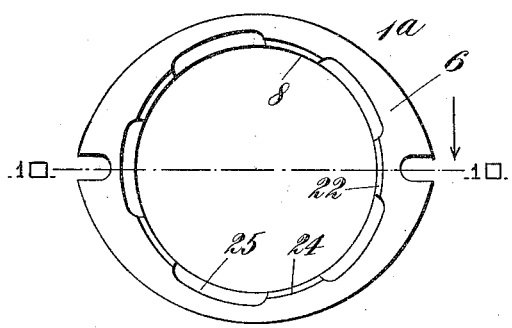
Figure 11:
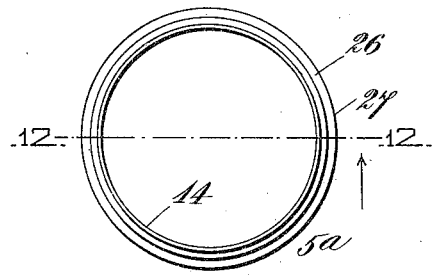
Figure 10:
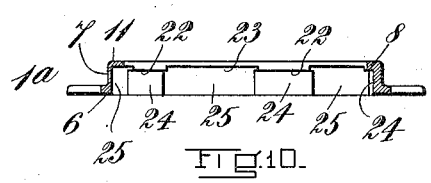
Figure 12:
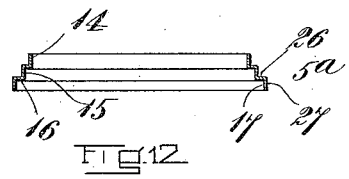
Figure 13:

Figure 1 shows in cross section a type of ring embodying my invention. Fig. 2 shows in cross section a further type of ring embodying my invention which type of ring is substantially like that shown in Fig. 1 excepting that an auxiliary ring or washer is interposed between the traveler ring and the top bearing surface of the base. Fig. 3 shows in plan a type of base looked at from the top side thereof. Fig. 4 is a cross section on the line 4—4 of Fig. 3. Fig. 5 shows in cross section the auxiliary ring or washer. Fig. 6 is a plan of a type of holder preferably employed, the holder being looked at from the top side thereof. Fig. 7 is a cross section on the line 7—7 of Fig. 6. Fig. 8 is a cross section, enlarged, showing in combination with a traveler ring an assemblage of parts like those shown in Figs. 3 to 7, inclusive. Fig. 9 is a plan of a further type of base embodying my invention, the base being looked at from the under side thereof. Fig. 10 is a cross section on the line 10—10 of Fig. 9. Fig. 11 shows in plan a further type of holder embodying my invention, the holder being looked at from the top side thereof. Fig. 12 is a cross section on the line 12—12 of Fig. 11. Fig. 13 is a cross section, enlarged, showing in combination with a traveler ring an assemblage of parts like those shown in Figs. 5 and 9 to 12, inclusive. Fig. 14 shows in plan a further type of base embodying my invention, the base being looked at from the top side thereof. Fig. 15 is a cross section on the line 15—15 of Fig. 14. Fig. 16 is a cross section, enlarged, showing in combination with a traveler ring an assemblage of parts like those shown in Figs. 5, 11, 12, 14 and 15. Fig. 17 is a plan of a further type of base embodying my invention, the base being looked at from the top side thereof. Fig. 18 is a plan of a base like that shown in Fig. 17 excepting that the base is looked at from the bottom side thereof. Fig. 19 is a cross section on the line 19—19 of Fig. 17, and Fig. 20 is a cross section, enlarged, showing in combination with a traveler ring an assemblage of parts like those shown in Figs. 5, 11, 12 and 17 to 19, inclusive.

In the drawings:—1 represents a base, 2 a traveler ring and 3 a traveler arranged upon the traveler ring. In the embodiment of my invention shown in Fig. 1 the traveler ring is shown mounted directly upon the base though in so far as my invention is concerned an auxiliary rotary ring or other rotating part 4 may be, as it preferably is, as shown in Fig. 2, interposed between the traveler ring and base.

5 is the holder which coöperates with or engages the base and by means of which the traveler ring is retained to properly rotate.

The base 1 is attachable to a ring rail or other fixture of support (not shown). For the purpose of this attachment the base is provided with a seating plate 6 which is secured to the ring rail in any suitable manner. The seating plate 6 has a central opening in it. From the point of or around this opening the base is extended upwardly by a body portion 7. This body portion of the base is in the nature of an imperforate casing preferably annular in form. At the point of its top edge the body of the base is extended inwardly for some little distance by a flange-forming portion 8. This flanged portion of the base acts to provide not only a bearing surface for supporting the traveler ring or auxiliary ring interposed between the traveler ring and base, as above described, but acts also to assist in the retention of the holder as will hereinafter be explained.

Referring now more particularly to the bearings or bearing surfaces presented by the base, attention is first directed to the surface or bearing 9 presented by the inside of the body portion of the base. This surface or bearing will for purposes of expediency be termed an inner radial bearing inasmuch as it acts, as will hereinafter be explained, by the bearing of the holder against it to restrain the movement of the holder and traveler ring secured to it as against radial displacement. In the embodiment of my invention shown in Figs. 1 to 8, inclusive, the bearing surface 9 is a continuous surface or bearing and preferably of some considerable depth extending preferably in parallel alinement with the vertical axis of the traveler ring assuming this ring to be located and normally operating in a horizontal plane. It is also to be observed that this surface or bearing 9 is considerably removed from the point of the vertical axis of the traveler ring. The base presents also a further continuous bearing surface 10 which surface or bearing is presented by the under side of the flanged portion 8 of the base. This surface or bearing will for purposes of expediency be termed an inner axial surface or bearing inasmuch as it acts to retain the holder and traveler ring as against displacement in an axial direction during the operation of the traveler ring. The bearing surface 10 is preferably a narrow bearing surface and extends also preferably at right angles to the said axis of the traveler ring. The base presents also what may be termed a top surface or bearing 11, the same being presented by the top side or face of the flanged portion 8 thereof. This surface or bearing in the present embodiment of my invention is a continuous surface or bearing like the surface or bearing 10 and preferably extends also at right angles to the axis of the ring. It is upon this surface or bearing 11 that the traveler ring, or other rotating part interposed between the traveler ring and base, rests to rotate.

The traveler ring 2 may be of any suitable construction. In practice I prefer to employ and adapt the construction and relation of the parts to the ordinary two-flanged ring in order that old rings may be used if desired.

The auxiliary ring or washer 4 interposed as shown between the traveler ring and base is a relatively thin flat ring annular in form and is made usually of metal or fiber dependent upon the circumstances under which it is used. It is, as will hereinafter be explained, attached to the traveler ring and rests upon the top bearing surface of the base to rotate thereon. In this construction it is to be observed that this auxiliary ring is of such size that it may cover the entire top bearing surface of the base and extend inwardly for some little distance beyond the inner edge of the flange 8 of the base on which the ring rests. The ring is also of sufficient size to extend outwardly beyond the base on which it rests and this outwardly-extending portion of the ring is preferably turned down to form an annular turned edge or rim 13.

The holder 5 connects with the traveler ring and from the point of its connection therewith extends downwardly into the base to coöperate with the axial and radial bearings of the base before mentioned. In form the holder is annular and comprises a clamping or head portion 14 extending from a point over the bottom flange of the traveler ring on the inside thereof, thence down and around this flange and for a short distance by the under side thereof for binding the holder to the traveler ring. The adaptability of this part of the holder is such that when the auxiliary ring or washer 4 is employed this auxiliary ring may be bound to the traveler ring by the same clamp that binds the holder to the traveler ring so that the auxiliary ring will rotate with the traveler ring. In other words, the adaptation of the auxiliary ring in relation to the holder and traveler ring is such that from the point of its engagement with the traveler ring it may extend downwardly and around the inside bottom edge of the auxiliary ring by which these parts become bound together. From the point of its attachment as aforesaid the holder is abruptly extended downwardly by a neck portion 15 which extends through the opening framed by the flange portion 8 of the base into the interior of the base to a point just below the axial bearing surface 10 thereof. From this point the holder extends outwardly to coöperate with the base by a shoulder 16 beneath the axial bearing surface 10 thereof and thence downwardly by a body portion 17 alongside the radial bearing surface 9 of the base. The downwardly-extending neck portion 15 of the holder it will be observed is some little distance removed from the inside edge of the flange 8 of the base on which account a vertical inside opening 18 is formed at a point just adjacent to the joint between the bearing surface of the base and the ring resting upon it. The holder in its shoulder portion 16 and body portion 17 is formed to present separate bearings at the points of engagement between these parts and the adjacent bearing portions of the base with vertical openings or clearances between these bearings. In other words, the holder is formed or bent whereby the shoulder portion 16 of the holder will present separate outer axial bearings 19 inasmuch as they are adapted to engage the inner axial bearing surface 10 of the base, while the body of the holder on the outside presents separate outer radial bearings 20, inasmuch as they are adapted to engage the inner radial bearing surface 9 of the base. Between these separate bearings of the holder are formed vertical openings or clearances 21. These openings are preferably of some considerable depth and extend from the opening 18 with which they connect downwardly to a point outside the joint between the body of the holder and the base.

In Figs. 9 to 13, inclusive, I have shown a further embodiment of my invention in the fact that the openings between the shoulder and body portions of the holder and adjacent portions of the base, which openings connect with the opening 18 before mentioned, are formed not in the shoulder but in the base, the base 1ª, in other words, being like the base 1, but formed to present a series of separate inside axial and radial bearings with openings or clearances between these bearings, while the holder 5ª is like the holder 5, but formed to present at the points of its shoulder and body portions outer continuous axial and radial bearing surfaces which coöperate with or engage the respective bearings of the base. The separate axial bearings of the base are designated 22. The openings or clearances between these bearings are designated 23. The separate radial bearings of the base are designated 24. The openings between these bearings are designated 25. The continuous axial bearing surface of the holder is designated 26, the continuous radial bearing surface 27. The disposition and arrangement of the respective inner axial bearings 22 of the base are such that the openings 23 between these bearings will connect at their inner ends with the opening 18 before mentioned and at their outer ends with the openings 25 between the radial bearings of the base. These openings 25 are vertical openings and extend from the point of their connection with the openings 23 between the axial bearings 24 as aforesaid to a point outside the joint between the body of the base and holder.

In Figs. 14 to 16, inclusive, I have shown a further embodiment of my invention which is preferably like the construction shown in Figs. 9 to 13, inclusive, just referred to, except that the openings 23 between the axial bearings of the base 1ª on the under side of the flange-forming portion 8 of this base are in the base 1ᵇ shown in these figures extended upwardly through the flange 8 on which account the top bearing surface 11 of the base 1ᵇ of the flanged portion 8 thereof will present not a continuous top bearing surface as in the construction previously described but a surface consisting of separate bearings with openings between these bearings, which openings are vertical openings, as it were, and connect immediately with the openings formed at the point of the joint between the axial and radial bearing portions of the base and holder. In connection with this modified construction attention is directed to the fact that the openings through the flange portion of the base are preferably arranged to leave a continuous bearing rim or edge 28 on the outside against which the ring 4 resting upon the base, is adapted to bear, on which account the ring will have at this point a continuous annular bearing contact with the top bearing surface of the base.

In Figs. 17 to 20, inclusive, I have shown a further modified construction which is also preferably like that shown in Figs. 9 to 13, inclusive, excepting that in the base 1ᶜ I have shown the base 1ª provided with a series of separate top bearings 29 on which the ring rests with horizontal openings 30 between these bearings. The openings 30 connect with the vertical opening 18 formed by foreshortening the flanged portion 8 of the base with respect to the neck portion of the holder 5ª. In other respects the base is substantially like the base 1ª, being provided with separate inside axial and radial bearings 22, 24, respectively, with connected openings 23, 25, respectively, between these bearings. In this connection it will be observed that the openings 23 and 25 within the base 1ª (which openings connect with the opening 18), are formed at the point of and beneath the raised bearings 29.

Other modifications might be shown, but the above illustrate the preferred embodiments of the different phases of my invention. It may also be explained and especially with reference to the base and holder that a base or holder entailing any of the above constructions may be struck from blanks, which is the way I prefer to make them.

In referring to the special utility of the elements of the above described construction attention is first directed to the fact that either of the bases 1, 1ª, 1ᵇ or 1ᶜ forms, as it were, a casing inclosing the interior working parts or bearings located within the base and practically sealing them from the ingress of lint or other foreign matter. Moreover, foreign matter cannot well enter these working parts or bearings from inside the base inasmuch as they are covered and protected by the holder. Practically the only part at which dirt or lint might enter is at the point where the ring or other rotating part rests to rotate upon the top bearing surface of the base, the lint entering from the outside. In a construction like that shown in Figs. 1 to 16, inclusive, the ring rests upon the base in such manner that lint cannot easily enter at this point owing to the fact that the ring maintains a continuous bearing contact with the base at the point of entry. In the event of lint or dirt entering the bearings or working parts their adaptation and arrangement are such that the lint will be swept away and directed out of the bearings.

In that embodiment of my invention shown in Figs. 1 to 8, inclusive, assuming dirt or lint to enter from the outside at the point of the joint between the top bearing surface of the base and the part rotating upon it. Owing to the wiping action of the rotating part over this surface the tendency will be to outwardly expel such matter from this joint. Should lint continue to work farther into the joint the tendency will be for it to eventually enter the opening 18 left between the inner edge of the flange 8 and the neck 15 of the holder and thence work out of the interior parts by falling downwardly through this opening and through the openings 21 in the holder with which the opening 18 connects.

In that embodiment of my invention shown in Figs. 9 to 20, inclusive, where separate openings are shown not in the holder but in the base, any lint that might enter the opening 18 by way of the joint between the top bearing surface of the base and the part rotating upon it will work out of this opening through the respective openings 23 and 25 in the base to a point outside the joint between the holder and the base. I prefer, however, the construction first described where the openings are formed in the holder inasmuch as the connected openings are more direct and the vibratory action of the holder during its operation assists in expelling dirt or lint by way of the openings between its separate bearings.

The provision of separate bearings and interposed openings at the points of the joints between the working parts tends also to free these joints of foreign matter that might enter them inasmuch as the tendency of the rotating part is to impel dust or lint to a point where it will enter the openings and become expelled from the joints. Such advantage resides in all the types of construction shown at the points of the joints formed between the base and holder. It resides also at the point of the joint between the top bearing surface of the base and the rotary part resting upon it as shown in Figs. 14 to 20, inclusive, where the top flanged portion of the base presents separate bearing surfaces with openings between them. In other words, lint that might enter the joint at this point will in the operation of the rotating part be swept off the separate bearings to fall through the openings between these bearings and thence out from between the bearing surfaces of the base and holder by way of the openings arranged at the point of the joint between these parts.

In Figs. 17 to 20, inclusive, the utility of the construction resides further in the fact that not only does the top bearing surface of the base present a series of separate raised bearings 29 off which dust or lint may be swept by the rotating part resting thereon into the openings 30 between these bearings, but the extension of the openings is such that air may enter from the outside at the points of these openings, thence pass to the vertical opening 18 between the foreshortened end of the flange 8 of the base and the neck portion 15 of the holder from whence it may circulate or pass out through the openings 23, 25, formed between the bearing surfaces of the base and holder to a point outside the joint formed by these bearing surfaces. In other words, not only may dust and lint be expelled through these connected openings, but the construction provides means whereby a circulation of air may be introduced to pass through these separate openings and assist in such expulsion. By providing in the respective bearing surfaces separate bearings further utility resides in the reduction of friction between the bearing parts. This is of considerable importance inasmuch as a large amount of friction-resisting surface is apt to interfere with the free and proper operation of the traveler ring. In this connection it will be explained that as long as the friction-bearing surfaces remain free of foreign matter which would interfere with the proper operation of the traveler, a relatively large amount of friction-bearing surface might not essentially interfere with the proper operation of the traveling ring for in this connection it will be explained that while it is necessary that the traveler ring have a free and proper rotary movement yet it is equally essential for its proper operation that it be restrained from rotating at excessive speed or so as to gather momentum when impelled by the pulls of the yarn upon the traveler. In such case when the frame is stopped the ring will continue to rotate with the result that the yarn is apt to be broken or if twisted strands of yarn are being spun the yarn will snarl. The difficulty with the continuous bearings between the working parts is that after much use they are apt to become clogged with dirt or lint which impedes even if it does not stop the action of the traveler ring as it might in some cases. By providing the friction-bearing surfaces with separate bearings and providing for the elimination of foreign matter between these bearing surfaces the difficulty above pointed out is overcome while provision is made for retarding the rotary action of the traveler ring and preventing excessive movement thereof by the particular arrangement and disposition of the operating parts which brings in the element of leverage to prevent the pull of the yarn upon the traveler from impelling the ring at too high a speed. In this connection attention is directed, as was before pointed out, to the fact that the interior bearings or bearing surfaces of the base and especially the radial bearing surface thereof against which the holder is adapted to bear for preventing radial displacement of the traveler ring, is considerably removed from the axial center of this ring. Such removal arises primarily from the manner in which the holder coöperates with or engages the base to provide these bearings, the holder being, as before described, extended outwardly to form a shoulder engaging the axial bearing of the base and thence downwardly by a body portion to engage the radial bearing thereof. By reason of such removal of the bearings from the axial center of the traveler ring a greater force is required to overcome the resistance of the frictional-resisting surfaces between the base and holder than if these surfaces were nearer the axial center of the ring. The reason for this is a matter of leverage, for assuming power to be applied to the traveler ring, the farther the work or resistance is away from the axial center of this ring the greater must be the force to overcome the work or resistance. The immediate advantage of such removal of the bearings resides in the fact that the traveler ring and holder influenced by such resisting surfaces resist the rotary impulsion of the traveler as it is rotarily impelled by the yarn with the effect that the traveler ring and holder normally rotate at a lesser speed than that of the traveler, or in other words, at such speed that the traveler ring will not gather momentum during its operation. Moreover, by controlling the holder and traveler ring to resist the rotary impulsion of the traveler as aforesaid, the normal resistance of these parts to the traveler is a more constant factor than if a large amount of frictionally contacting surface were relied upon to effect such resistance.

By graduating the amount of frictionally contacting surface between the working parts and the base as may be done by providing separate bearings as aforesaid and by graduating the size of these bearings and also the relative distance these bearings are from the axial center of the traveler ring just the proper amount of resistance may be imparted to the holder and traveler ring to resist the rotary impulsion of the traveler dependent upon the work to be done. When light yarns are being spun which impart but little pull to the traveler to rotarily impel the traveler ring, then the amount of frictional resisting surface between the working parts and base need not be such as will materially influence the speed of the traveler ring. When, however, heavier yarns are being spun then of course the frictional resistance between the working parts must be increased in order to insure a proper operation of the holder and traveler ring. Usually it is desirable to make the auxiliary ring interposed between the traveler ring and base of some material having an increased frictional resistance over metal, as for example, fiber, leather or similar material. By making the auxiliary ring of fiber or leather I have found that its increased frictional resistance with the top bearing surface of the base acts to a marked degree in graduating or controlling the speed of the traveler ring and holder especially during the spinning of heavy yarns. As I have already explained, I prefer to use an auxiliary ring 4 between the traveler ring and base under all circumstances even though this ring be made of metal for a wearing surface is provided in such a ring and as the auxiliary ring is a relatively thin flat ring, it can be made with great precision which especially fits it for a bearing ring as compared with the traveler ring which oftentimes, owing to imperfections or wear, especially if the traveler ring be an old one, unfits it for becoming a true bearing ring.

In connection with the auxiliary ring attention is called to the down-turned edge or rim 13. This rim or edge acts as a means for reinforcing or strengthening the auxiliary ring. It acts also to prevent vibration. It assists, also, by its overlapping the base at the point of the joint between the auxiliary ring and the top bearing surface of the base, in preventing dust or lint from entering this joint from the outside.

By the term "rotary traveler ring and rotary holder therefor" as referred to herein and in the claims is meant a rotary traveler ring and holder having either an entire or partial rotation inasmuch as the construction herein described is applicable to a rotary traveler ring and holder having a partial rotation.

Having thus fully described my invention, I claim and desire to secure by Letters Patent of the United States:—

1. In a mechanism of the character specified, the combination with a rotary traveler ring, of separate members comprising a base having a raised body portion and an inwardly-extending flange-forming portion and a holder coöperating with said base by axial and radial bearings forming a joint between said members by which said ring is retained against axial and radial displacement, one of which members is provided with separate bearings at the point of the joint between said members with openings between said separate bearings opening out of said joint.

2. In a mechanism of the character specified, the combination with a rotary traveler ring, of separate members comprising a supporting base and a rotary holder coöperating with said base by axial and radial bearings forming a joint between said members by which said ring is retained against axial and radial displacement, said base presenting a raised body portion and a flange-forming portion extending inwardly therefrom, said holder coöperating with said base by a neck portion entering said base by the flange-forming portion thereof and removed therefrom to leave a clearance between said parts and which holder after entering said base to extend by the flanged portion thereof extends outwardly beneath said flange-forming portion of said base for an axial bearing and downwardly by the body of said base for a radial bearing and one of which members is provided with separate bearings at the point of the joint between said members with openings between said separate bearings communicating with the clearance between the flanged portion of said base and said body of the holder and opening out of said joint to provide outlets therefrom.

3. In a mechanism of the character specified, the combination with a rotary traveler ring, of separate members comprising a base having a body portion with an inturned head or flange and a rotary holder for said traveler ring extending into said base, thence outwardly beneath the flange-forming portion thereof and thence downwardly alongside the body of said base and forming a joint between said members by which said ring is retained against axial and radial displacement, one of which members is provided with separate bearings at the point of the joint between said members with openings between said separate members opening out of said joint.

4. In a mechanism of the character specified, the combination with a rotary traveler ring, of a supporting base and a rotary holder coöperating with said base for retaining said ring as against axial and radial displacement during the operation thereof, said base presenting a top bearing surface and having an imperforate body portion and a flange-forming portion extending inwardly therefrom, said holder entering said base to extend by the flange-forming portion thereof, thence extending outwardly beneath said flange-forming portion of the base to coöperate therewith for an axial bearing and with the interior surface of said body of the base for a radial bearing, and which holder at the point of the joint between it and said base is provided with separate bearings communicating with the top bearing surface of said base and opening out of said joint.

5. In a mechanism of the character specified, the combination with a rotary traveler ring of separate members comprising a supporting base presenting a top bearing surface provided with separate bearings with openings between the said bearings, a rotary holder for said ring coöperating with said base inside the same by axial and radial bearings forming a joint between said members below said top bearing surface of the base and one of which members is provided at the point of the said joint between said members with separate bearings and openings between said bearings communicating with the openings in the top bearing surfaces of said base and opening out of said joint.

6. In a mechanism of the character specified, the combination with a rotary traveler ring, of separate members comprising a supporting base and a holder coöperating with said base to form a joint between said members for retaining said ring against displacement during the operation thereof said base having a raised imperforate body portion and an interior flange-forming portion, said base presenting also a top bearing surface and on the inside interior bearing surfaces against which said holder bears by outer bearing surfaces forming a joint for retaining said ring as aforesaid, and one of which members is provided with separate bearings at the point of the joint between said members with openings between said separate bearings communicating with the top bearing surface of said base and opening out of said joint.

7. In a mechanism of the character specified, the combination with a rotary traveler ring of separate members comprising a supporting base and a rotary holder coöperating with said base for retaining said ring against displacement during the operation thereof, said base having a raised body portion with an inturned head or flange, said base presenting also a top bearing surface and on the inside axial and radial bearing surfaces with which said holder coöperates to form a joint between said members for retaining said traveler ring as aforesaid, one of which members also at the point of said joint between the same is provided with separate bearings and openings between said bearings, and an auxiliary ring or washer interposed between the top bearing surface of said base and said traveler ring and adapted to frictionally retard the same during the operation thereof.

8. In a mechanism of the character specified, the combination with a rotary traveler ring, of separate members comprising a base supporting said ring, and a rotary holder coöperating with said base for retaining said ring against displacement during the operation thereof, said base having a raised body portion with an inturned head or flange presenting a top bearing surface and on the inside thereof separate auxiliary and radial bearing surfaces with which said holder coöperates by extending inside said base, thence outwardly beneath the flange forming portion thereof and downwardly alongside the body portion of said base forming a joint between said members, one of which members also is provided at the point of said joint between said members with separate bearings, and an auxiliary ring or washer interposed between the top surface of said base and said ring and adapted to frictionally retard the same during the operation thereof.

9. In a mechanism of the character specified, the combination with a rotary traveler ring, of a base having a raised, imperforate body portion, said base presenting on the top side thereof a bearing surface, an auxiliary ring or washer interposed between said traveler ring and the bearing surface of said base to rotate thereon, the outer edge of said auxiliary ring being turned downwardly to cover the joint between said auxiliary ring and the top bearing surface of said base, and a holder coöperating with said base for retaining said rings in proper operative position.

10. In a mechanism of the character specified, the combination with a rotary traveler ring, of an auxiliary ring or washer rotatable with said traveler ring and separate members comprising a base supporting said rings and a holder coöperating with said base for retaining said rings in operative position on said base, said base having a raised body portion with an inturned head or flange, said base presenting also a top bearing surface on which said auxiliary ring rests and on the inside axial and radial bearing surfaces with which said holder coöperates forming a joint between said members for retaining said rings as aforesaid, and one of which members is provided with separate bearings at the point of the joint between said members with openings between said separate bearings in communication with the top bearing surface of said base and opening out of said joint.

11. In a mechanism of the character specified, the combination with a rotary traveler ring, of an auxiliary ring or washer secured to and rotatable with said traveler ring and separate members comprising a base supporting said rings and a holder coöperating with said base for retaining said rings in operative position on said base, said base having a raised body portion with an inturned head or flange, said base presenting also a top bearing surface on which said auxiliary ring rests to rotate thereon and on the inside axial and radial bearing surfaces to said flanged and body portions of said base, respectively, and which holder coöperates with said base by extending inside the same, thence outwardly beneath the flange-forming portion thereof and downwardly alongside the body portion of said base forming a joint between said members by which said holder and rings retained thereby are maintained in proper position during the operation thereof, and one of which members is provided at the point of the joint between said members with separate bearings with openings between said bearings in communication with the top bearing surface of said base and opening out of said joint.

12. In a device of the character specified, the combination with a rotary traveler ring, of a base presenting a bearing surface located outside the vertical annular plane of said traveler ring when in an operative position, a controller ring secured to said traveler ring, the same being larger than said traveler ring and interposed between it and the bearing surface of said base whereby it may rest to rotate thereon, a holder connecting with said traveler ring and coöperating with said base for axially and radially retaining said traveler ring, and which holder is adapted to bind said controller ring to said traveler ring whereby they may rotate together.

13. In a device of the character specified, the combination with a rotary traveler ring, of a base supporting said ring, said base having a body, a flange extending inwardly therefrom, said base presenting also a top bearing surface, an inside under bearing surface to the flanged portion of said base and an inside lateral bearing surface to the body thereof and which inside under and lateral bearing surfaces of said base are located wholly or in part outside the annular plane of said traveler ring when in an operative position, and a rotary holder connecting with said traveler ring to rotate in unison therewith and extending into said base by the flanged portion thereof and thence outwardly to coöperate with the said inside under and lateral bearing surfaces thereof for retaining said ring.

14. In a device of the character specified, the combination with a rotary traveler ring, of a base supporting said ring, said base having a body, a flange extending inwardly therefrom, said base presenting also a top bearing surface, an inside under bearing surface to the flanged portion of said base and an inside lateral bearing surface to the body thereof, and a rotary holder connecting with said traveler ring to rotate in unison therewith and extending into said base by the flanged portion thereof and thence outwardly to coöperate with the said inside and lateral bearing surfaces thereof for retaining said ring against axial and radial displacement during the operation thereof.

15. In a device of the character specified, the combination with a rotary traveler ring, of a base having a body and a flange portion extending inwardly from said body, the said base presenting a top bearing surface, an under bearing surface on the under side of the flange portion of said base, and a lateral bearing surface on the inside of the body thereof, an auxiliary ring or washer located between said traveler ring and the upper bearing surface of said base, and a holder connecting with said traveler ring and extending therefrom into said base, thence outwardly beneath the under bearing surface of the flange portion thereof and thence downwardly to coöperate with the lateral bearing surface of said base.

16. In a device of the character specified, the combination with a rotary traveler ring, of a base having a body and a flanged portion extending inwardly therefrom, said base presenting a top bearing surface, an under bearing surface to the flanged portion thereof and a lateral bearing surface to the inside of the body thereof, an auxiliary ring or washer secured to said traveler ring and located between it and the top bearing surface of said base, and a rotary holder connecting with said rings and extending therefrom into said base, thence outwardly beneath the under bearing surface thereof and downwardly alongside the lateral bearing surface of said base to coöperate with said surfaces.

17. In a device of the character specified, the combination with a rotary traveler ring, of a base having a body and a flange portion extending inwardly from the top end of said body, the said base presenting a top bearing surface and under bearing surface to the flange portion thereof, and a lateral bearing surface on the inside of the body of said base, the bearing surfaces of said base being located wholly or in part outside the vertical annular plane of said traveler ring when in an operative position, a controller ring attached to said traveler ring and interposed between it and said base, the said controller ring being larger than said traveler ring whereby it may extend outwardly to rest and rotate upon the top bearing surface of said base, a holder securing said controller ring to said traveler ring, thence extending from the point of attachment of said rings into said base, thence outwardly beneath the under bearing surface thereof, and thence downwardly alongside the lateral bearing surface of said base.

MICHAEL H. MALONEY.

Witnesses:
JOHN E. R. HAYES,
GEORGE LANGTON.

Copies of this patent may be obtained for five cents each, by addressing the "Commissioner of Patents, Washington, D. C."